UNITED STATES PATENT OFFICE.

GUSTAV W. GOERNER, OF BOSTON, MASSACHUSETTS, ASSIGNOR TO THE ROESSLER AND HASSLACHER CHEMICAL COMPANY, OF PERTH AMBOY, NEW JERSEY, A CORPORATION OF NEW YORK.

CELLULOSE-ACETATE SOLUTION.

1,384,188.  Specification of Letters Patent.  Patented July 12, 1921.

No Drawing.  Application filed June 9, 1920. Serial No. 387,677.

*To all whom it may concern:*

Be it known that I, GUSTAV W. GOERNER, citizen of the United States of America, and resident of Boston, in the county of Suffolk and State of Massachusetts, have invented new and useful Improvements in Cellulose-Acetate Solutions, of which the following is a specification.

My invention relates to solutions of cellulose esters of the monobasic fatty acids, of which cellulose acetate in its various forms and modifications is technically and commercially the most conspicuous example, and consists in a new composition of matter, namely, the solution of such an ester in methylene chlorid (dichlormethane).

I use the word solution in a comprehensive sense, as denoting mutual extension of reciprocally miscible substances, and including the physical condition of plasticity.

The cellulose acetate produced by reaction of fibrous cellulose with acetic anhydrid and glacial acetic acid in the presence of sulfuric acid, acting as a catalyst, and which is characterized by solubility in chloroform, I have discovered to be equally soluble—or substantially as soluble—in methylene chlorid. Acetates which differ from the acetate above mentioned, in that their modification manifests itself by inferior solubility in chloroform, to the border-condition of plasticity therein, behave similarly in methylene chlorid.

But, with respect to these acetates, I have discovered that the addition to the methylene chlorid of a moderate proportion of either ethyl or methyl alcohol—about 5% by weight, on the methylene chlorid, maintains the efficiency of the solvent as such, and provides a composite liquid in which acetates solvent only to an inferior degree in methylene chlorid are as freely solvent as is the acetate first above mentioned in methylene chlorid alone.

The proportion of alcohol in the mixture which serves as a solvent in such cases is variable, provided the methylene chlorid be the preponderant ingredient. The maximum limit for the proportion of alcohol, consistent with the solvent-function of the mixture, is also variable, but can readily be determined empirically with any given acetate presented for solution. A point will be reached when the proportion of alcohol is too large, and this practical maximum for the specific instance in hand is announced by the refusal or reluctance of the acetate to go into solution. The minimum limit for the alcohol proportion is likewise variable, and ascertainable by similar empirical test. In such instances as have been observed, the maximum of alcohol is indicated to be in the neighborhood of 10% on the methylene chlorid, the minimum in the neighborhood of 2%.

Solutions of cellulose esters, exemplified by the acetate, in methylene chlorid, constitute compositions of matter of which the uses and adaptations are similar to those of known solutions of cellulose esters; these uses and adaptations need not, therefore, be enlarged upon.

What I claim, and desire to secure by Letters Patent is:

1. A solution of a cellulose ester of a monobasic fatty acid in a solvent comprising methylene chlorid as the predominant ingredient.

2. A solution of a cellulose ester of a monobasic fatty acid in methylene chlorid.

3. A solution of a cellulose ester of a monobasic fatty acid in a solvent comprising methylene chlorid and alcohol, the former in predominance.

4. A solution of cellulose acetate in a solvent comprising methylene chlorid as the predominant ingredient.

5. A solution of cellulose acetate in methylene chlorid.

6. A solution of cellulose acetate in a solvent comprising methylene chlorid and alcohol, the former in predominance.

Signed by me at Boston, Massachusetts, this seventh day of June, 1920.

GUSTAV W. GOERNER.